April 14, 1936.  R. E. BURNS  2,037,004
PROCESS OF PRODUCING SAPONIFIED MATERIAL
Filed Jan. 23, 1935  2 Sheets-Sheet 1
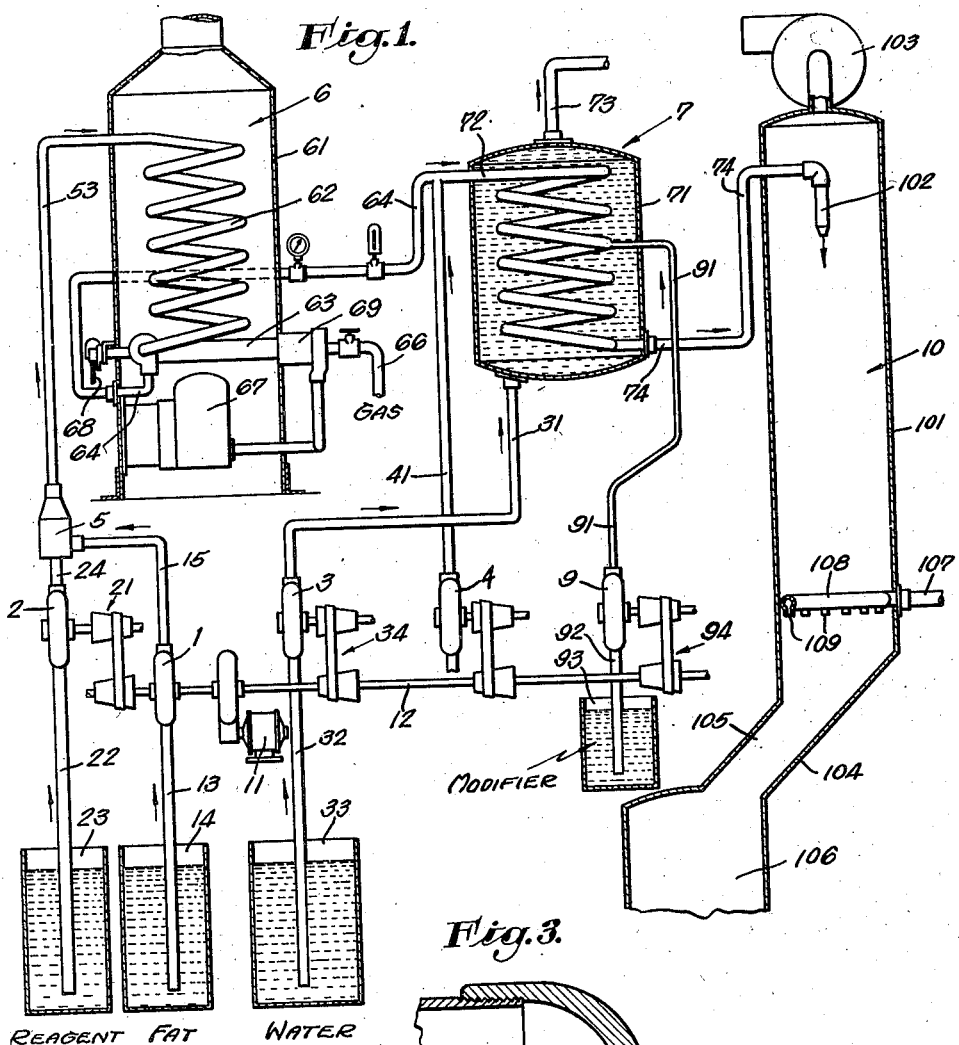
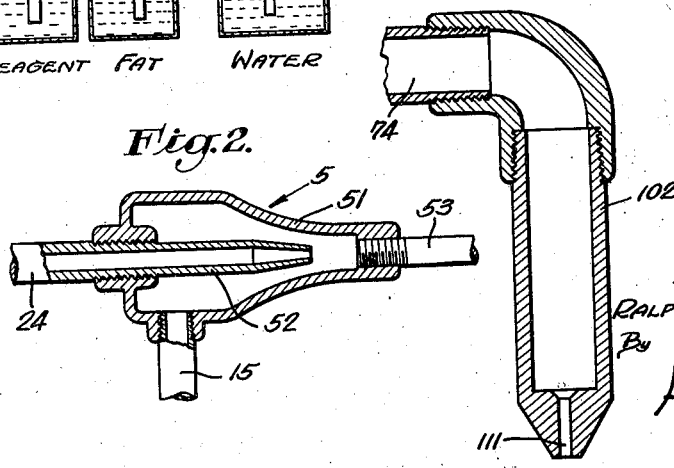
INVENTOR:
RALPH EVERETT BURNS,
By
ATTORNEY.

April 14, 1936.　　　R. E. BURNS　　　2,037,004
PROCESS OF PRODUCING SAPONIFIED MATERIAL
Filed Jan. 23, 1935　　2 Sheets-Sheet 2
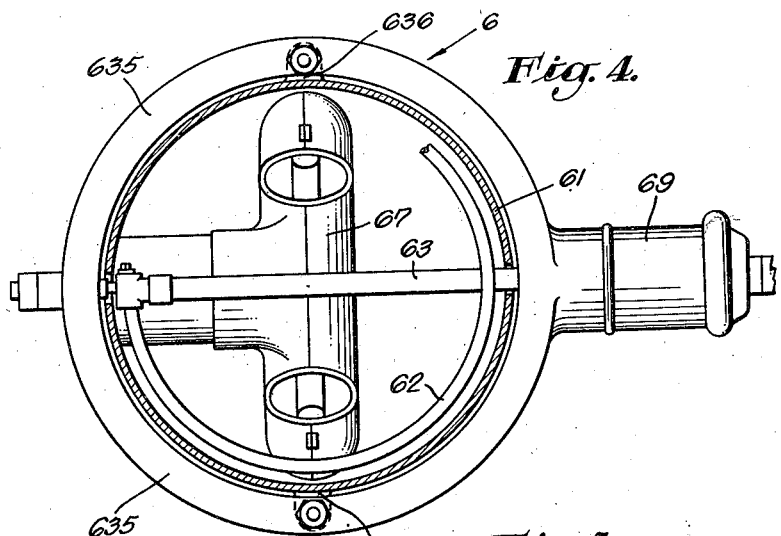
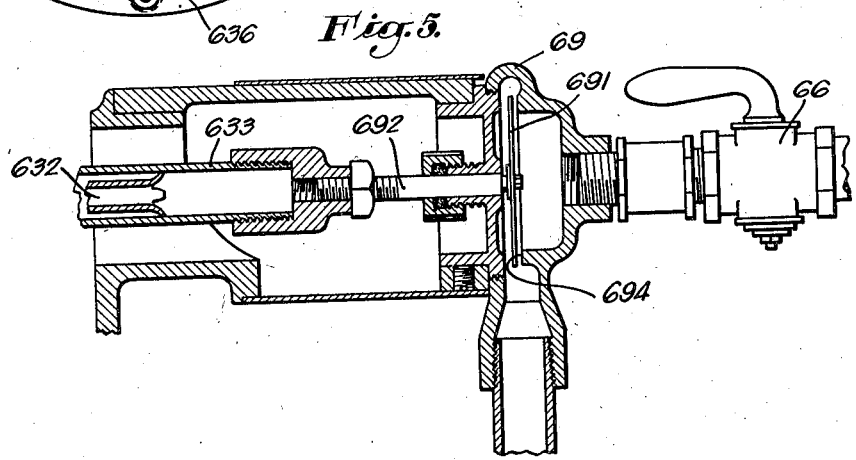
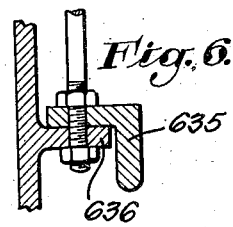
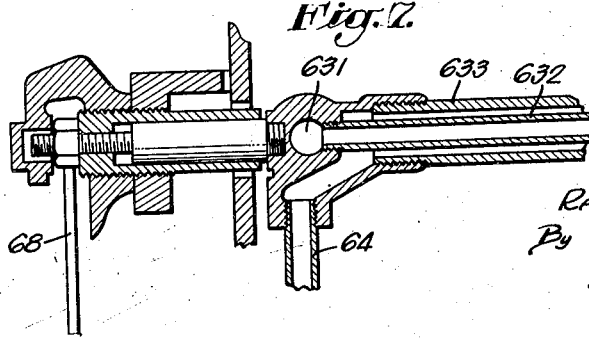
INVENTOR:
RALPH EVERETT BURNS,
By
ATTORNEY.

Patented Apr. 14, 1936

2,037,004

UNITED STATES PATENT OFFICE 2,037,004

PROCESS OF PRODUCING SAPONIFIED MATERIAL

Ralph Everett Burns, Los Angeles, Calif., assignor to Refining, Inc., Reno, Nev., a corporation of Nevada Application January 23, 1935, Serial No. 3,139

2 Claims. (Cl. 87—16)

My invention relates to the production of saponified material, such as soap, rosin size, and the like, and the principal object of the invention is to produce such a saponified material of definite and controlled water content directly from a saponifiable material such as fats, oils, greases, rosin, or the like, by reaction with an aqueous solution of a saponifying reagent such as caustic soda, caustic potash, or the like.

A further object of the invention is to produce such saponified material in granulated or powdered form.

A further object of the invention is to provide a process in which air is introduced into the saponified material during its course of manufacture for the purpose of improving its color, decreasing its specific gravity, and increasing the volume of the finished product.

A further object of the invention is to provide means for introducing a modifier, such as coloring material, filler, or perfumes, into the saponified material during the course of its manufacture for the purpose of modifying the characteristics of the final product.

Further objects and advantages will be made evident hereinafter.

My invention is well adapted to the production of granular soap from soap fat, and its application to such manufacture will be described as well illustrating one use to which the process may be put, without limiting the invention to such a specific use, other uses being obvious to one skilled in the art to which it pertains.

In the process of producing soap, which is a saponified material, it is standard practice to mix an aqueous solution of a saponifying alkali, hereinafter sometimes called the "reagent," with a saponifiable fat, hereinafter sometimes called simply the "fat", or saponifiable material, and to agitate and heat the mixture until the fat is broken up into glycerine and fatty acids, the fatty acids combining with the alkali to produce the soap. By the term "saponifiable fat" I wish to be understood to mean any fat which could be used in the known processes of making soap, and by a "saponifying alkali" I wish to be understood to mean any of the alkalies which are at present used in soap making. In practice I prefer to use an aqueous solution of caustic soda, although caustic potash, soda ash, and other alkalies may be used.

The process of making soap which is generally practiced involves the placing of the fat in a large kettle in which it is heated and to which the alkali is added, the fat being agitated during this addition to produce an intimate mixture of the alkali with the fat. After the fat and alkali have been thoroughly mixed together in the proper proportions, which is readily determined by the skilled soap maker, the charge is heated and agitated for a considerable period until practically all of the fats are broken up and the fatty acids thereof are combined with the alkali.

If granules are to be made, the process following the saponification of the fats is as follows. The saponified material is taken from the kettle and mixed with any desired modifier as it is run into what is known as a crutcher, which is virtually a tank on wheels holding about 1,000 lbs. of soap. After the soap and modifier are thoroughly mixed in the crutcher, the material is run through a series of steel rolls, which are chilled, and scraped off into flakes; these flakes are then run through air driers and from there into a hammer mill, which breaks them up into granules.

My process has many advantages over the present soap making processes, as will be made evident hereinafter.

A convenient apparatus for carrying on the process invented by me is shown in the accompanying drawings, in which:

Fig. 1 is a diagrammatic representation of an assembly of different units used to carry on the process.

Fig. 2 is a cross-section through a convenient form of mixer.

Fig. 3 is a section through the ejector nozzle of the invention shown in Fig. 1.

Fig. 4 is a plan view partially in section of the lower portion of the heater 6 showing the thermostat and burner.

Fig. 5 is a section drawn on an enlarged scale through the right-hand end of the thermostat as viewed in Fig. 1.

Fig. 6 is a section showing the method of supporting the thermostat.

Fig. 7 is a section on an enlarged scale through the left-hand end of the thermostat as viewed in Fig. 1.

The apparatus employed consists of a fat pump 1, a reagent pump 2, a primary water pump 3, an air pump 4, a mixer 5, a heater 6, a cooler 7, a modifier pump 9, and a granule fabricator 10.

The pump 1 is driven directly from a main shaft 12 which is driven by a motor 11. The pump 1 draws fat through a pipe 13 from a fat supply tank 14 and delivers this fat under pressure through a pipe 15 to the mixer 5.

The reagent pump 2 is driven from the main shaft 12 through a variable speed gear 21, the pump 2 taking reagent through a pipe 22 from a reagent tank 23 and delivering this reagent through a pipe 24 to the mixer 5.

The variable speed gear 21 and certain other variable speed gears 34 and 94, hereinafter referred to, are shown diagrammatically as consisting of two reverse cone pulleys connected by a belt, the position of which on the pulleys can be fixed in any position by the operator of the plant, thus fixing the relative speeds of the two pulleys at a ratio between a lower and a higher limit. This type of variable speed drive is used merely for illustrative purposes since it is well known in the arts. Other means by which the operator can regulate the proportional feeding of any material may be substituted therefor if desired.

The exact form of the mixer 5 is not important, that shown in Fig. 2, however, being a convenient form. In the form shown a casing 51 surrounds a central pipe 52 through which the reagent is pumped, the fat from the pipe 15 being delivered to the space around this central pipe 52. The reagent and fat are combined or mixed as they leave the mixer 5 and the mixture so produced is delivered through a pipe 53 to the heater 6.

The heater 6 consists of an outer shell 61 in which is mounted a pipe coil 62. The lower end of this pipe coil delivers liquid to a thermostat 63 from which the liquid is delivered through a pipe 64 to the cooler 7. A valve or other control device 69 controls the flow of gas or other fuel from a pipe 66 to a burner 67, the valve 69 having the function of regulating the supply of gas passed to the burner. The thermostat 63 forms an automatic means responsive to changes in temperature of the liquid passing therethrough from the coil 62 for actuating the control device. Adjusting means 68 may be provided on the thermostat. The hot products of combustion from the burner 67 constitute a heating medium for the coil 62 and the amount of heat delivered to this coil is, of course, regulated by the amount of gas which is passed to the burner.

The heater shown is that disclosed in the application of Walter B. Kerrick, Serial No. 495,635, filed Nov. 14, 1930, Figs. 4, 5, 6, and 7 being drawings copied from that application.

The end of the coil 62 communicates with an opening 631 which communicates with an inner pipe 632, the end of which is open as shown in Fig. 5 and which communicates with an outer pipe 623. This outer pipe connects to the pipe 64 so that liquid from the coil 62 flows through the pipe 632 into the right-hand end of the pipe 633 and inside this pipe from right to left, this liquid being finally delivered to the pipe 64. Due to the passage of hot liquid through the pipes 632 and 633 the pipe 633 expands or contracts and operates a valve 691 forming part of the control device 69 as shown in Fig. 5, being operated through a stem 692 from the pipe 633. The expansion or contraction of the pipe 633 therefore moves the valve 691 towards or away from a seat 694 which controls the flow of gas from the pipe 66, thus regulating the amount of gas delivered to the burner 67. The adjusting means 68 shown in Fig. 7 tends to move the thermostat bodily so that the temperature at which the valve 691 closes may be regulated by the operator at will. The entire thermostat is mounted on a ring 635 which encircles the shell 61 and is supported on suitable lugs 636.

The cooler 7 may be of any convenient form, that shown consisting of a tank 71 inside which is a cooling coil 72, the inlet end of which is connected to the pipe 64. Cooling water is delivered to the tank 71 through a pipe 31 from the primary water water pump 3, this water being taken through a pipe 32 from a water tank 33. The primary water pump 3 is driven from the shaft 12 through a variable speed gear 34. Excess water and steam are removed from the top of the tank 71 through a release pipe 73. The coil 72 is connected through a pipe 74 to the upper end of the granule fabricator 10.

Modifier may be delivered to the coil 72 through a pipe 91 from the modifier pump 9, this pump drawing material through a pipe 92 from a tank 93. The pump 9 is driven from the shaft 12 through a variable speed gear 94.

The granule fabricator 10 consists of a cylindrical shell 101 in the top of which is placed a nozzle 102 which is connected to the pipe 74. An exhaust fan 103 draws air from the top of the shell 101. The shell 101 has an inclined bottom 104 which delivers material through a chute 105 into a closed storage chamber 106. A gas inlet pipe 107 projects through the side of the shell and connects to a ring 108 having perforations 109 in the bottom thereof. Means not shown for delivering dry hot air to the pipe 107 are provided.

The nozzle 102 is provided with a constricted orifice 111, as shown in Fig. 3. The air pump 4 is shown diagrammatically and in practice should be an air compressor capable of pumping air through a pipe 41 into the inlet end of the coil 72 of the cooler regardless of the pressure that may be maintained therein.

The materials in the tanks 14, 23, 33, and 93 are replenished from time to time as they become partially used and automatic means for accomplishing this may be provided if desired.

If the saponifiable material which is used is not liquid at room temperatures, means, not shown, must be provided in the tank 14 for heating it so that it is rendered sufficiently liquid to pump readily, and heating means, not shown, may also be supplied to the tanks 23, 33, and 93 is desired.

Suitable valves, not shown, are provided for controlling the flow of liquids conveniently, and suitable gauges and thermometers, not shown, are provided for indicating conditions within the apparatus.

The method of operation is as follows.

Fat is pumped continuously by the pump 1 from the tank 14 through the pipe 15 into the mixer 5. The speed at which the fat is pumped may be regulated by changing the speed of the motor 11.

Reagent is pumped continuously from the tank 23 to the mixer 5 through the pipe 24 by the pump 2. The variable speed gear 21 permits the rate at which reagent is added to the fat to be varied within limits. The proportion of reagent so added depends, of course, upon the character of the fat used. If an aqueous solution of caustic soda is used having a gravity of 30° Baumé and a mixture of equal parts of tallow and cocoanut oil is to be treated, it will be found that if reagent is supplied at the rate of about forty-five per cent of the volume of the fat, good results will be obtained. The amount of reagent which should be supplied to produce good saponification without leaving too much excess reagent or excess unsaponified fat is, of course, readily determinable by any skilled soap maker.

Using a coil 62 consisting of about 300 feet of pipe ½ inch inside diameter, good results can be obtained if from one-third gallon to one gallon per minute of fat is delivered to the mixer 5.

The pumps 1 and 2, the variable speed gear 21, and the mixer 5, taken collectively, constitute a proportioning device having the function of delivering a mixture of fat and reagent (in proper proportions) to the coil 62 of the heater. Other means of performing this function will be obvious to one skilled in the art. For example, the mixture of fat and reagent may be produced in the tank 14, in which case the tank 23, the pump 2, the variable speed gear 21, and the mixer 5 may be dispensed with, the pipe 15 being connected to the pipe 53. The arrangement shown has, however, certain advantages, among which may be mentioned the automatic mixing in the right proportion and the ease by which this proportion can be changed by varying the speed of the pump 2 by manipulating the variable speed gear 21.

The function of the mixer 5 is to bring the fat and reagent together and while the mixer shown jets the reagent into the oil, and this is a convenient method of producing an intimate mixture, this is not necessary since the fat and reagent are thoroughly mixed due to the mild turbulence produced in the coil 62.

The function of the heater 6 is primarily to raise the temperature of the mixture of fat and reagent to a point at which saponification is facilitated. It will be found that excellent results are obtained if a temperature of from 400 to 500° F. is maintained in the coil 62. For reasons which will be hereinafter explained it will be found possible to maintain a pressure of from 150 to 500 pounds per square inch on the liquid leaving the coil 62 and this pressure also assists in splitting the fat into free fatty acid and glycerine, the free fatty acid combining with the reagent to produce soap. The reaction between the fat and reagent seems to be facilitated by the velocity and mild turbulence produced in the mixed fat and reagent as it flows through the coil 62. This turbulence tends to constantly disperse any uncombined reagent in the body of the mixture so that it is brought into intimate contact with any particles of unsaponified fat, thus promoting the desired saponification reaction.

The thermostat 63 plays an important part in the operation of the process. Its function is to insure that the mixture flowing through the pipe 64 is maintained at a constant temperature. Any increase in this temperature expands the pipe 633 and tends to force the valve 691 toward its seat 694. This tends to reduce the amount of fuel gas passing to the burner 67 and this reduces the volume of the heating medium; that is, the hot products of combustion, passing from the burner 67 up into the space surrounding the coil 62 where it is available to heat the mixture of fat and reagent passing through the coil 62.

The material passing through the pipe 64 is preferably in liquid condition. This material is cooled in the cooler 7. The function of the cooler 7 is to reduce the temperature of the mixture containing the saponified material delivered through the pipe 64. The temperature of the mixture in the pipe 64, in the case of soap manufacture, may be in the neighborhood of 500 to 600° F. This high temperature is desirable to produce a rapid and efficient saponification. If the mixture were delivered directly to the interior of the granule fabricator 10 or to the open air while at this high temperature, large volumes of water vapor would be produced in the soap and escape therefrom. For the purpose of controlling the amount of water vapor produced and thus controlling the amount of water left in the soap, the mixture is cooled in the cooler 7 before being released into the granule fabricator 10.

The degree of this cooling is regulated by adjusting the amount of water supplied to the cooler 7 by the pump 3. This regulation can be conveniently made by adjusting the speed of the pump 3 by the variable speed gear 34. Due to the fact that the pumps 1, 2, and 3 are all driven by the shaft 12, all three pumps act as proportioning pumps, so that the amount of cooling in the cooler 7 is proportioned to the rate of supply of raw materials and varies directly with any variation in that rate.

In the production of soap it is often desired to add to the soap during manufacture certain substances such as inert fillers, coloring, or scent producing substances, or the like. It is often desirable to introduce such substances after the temperature of the soap has been lowered somewhat from that at which the reaction is produced. For convenience I call all such substances "modifiers". They may affect either the physical or chemical characteristics of the soap, or both.

Such modifiers may be conveniently introduced into the coil 72 of the cooler 7 through the pipe 91 from the pump 9. Since this pump is also driven from the shaft 12 through the variable speed gear 94, the proportion in which modifier is introduced can be maintained constant or varied by the operator of the plant.

By introducing the air and/or modifier prior to or during the passage of the mixture through the coil of the cooler, the air or modifier is distributed throughout the body of the soap due to turbulence produced by the coil. By introducing the air or modifier before the soap is thoroughly cooled by the cooler 7 and while the soap is still very liquid, the uniformity of this distribution is promoted. The air and modifier are, of course, entrained in the soap as it solidifies due to cooling.

The function of the granule fabricator 10 is to produce granules of soap. By the term "granules" I mean particles of soap which may be about the size of mustard seed, although by a suitable nozzle very fine soap particles can be produced. This function is performed by ejecting the partially cooled soap through the constricted orifice 111. In practice the soap is cooled in the cooler 7 to a temperature in the neighborhood of 240° F. at which temperature it enters the nozzle 102. This temperature can be conveniently attained by allowing the water in the cooler 7 to boil at atmospheric pressure.

With a plant operating under the conditions previously described, a constricted orifice 111 which is $\frac{3}{32}''$ in diameter and $\frac{1}{16}''$ long axially gives excellent results. The soap leaves the constricted orifice 111 with considerable velocity and at the time it leaves the orifice contains some steam and some air which are intimately distributed through the soap granule and which, due to the lowering of pressure in the orifice 111, expand, producing an exceedingly spongy granule. A considerable portion of the steam escapes from the granule into the hot dry air, flowing upwardly through the shell 101 to the exhauster 103 from the orifices 109 in the ring 108. The soap granules fall slowly through the shell 101 and their external surface is dried by the hot dry air so that the granules will not stick together or pack on the bottom 104 but will fall through the chute 105 into the storage chamber 106. If a heavy granule is desired, i. e., one that will sink in water, no air is injected into the cooler coil 72 through the pipe 41, in which event the granules are relatively heavy and tend to sink in water almost immediately dissolving if thrown into water, however, due to their spongy nature. If considerable air is injected, the granules dissolve on the surface of any body of water upon which they are thrown.

This application is a continuation in part of my application Serial 683,162, filed August 1, 1933.

I claim as my invention:

1. A process of producing a saponified product containing a modifier directly from a saponifiable material by reaction with a saponifying reagent which comprises: causing a properly proportioned mixture of a saponifiable material and an aqueous solution of a saponifying reagent to flow through a reaction zone in which said reagent reacts with said saponifiable material and a suspension containing a saponified substance is formed, said mixture being at a sufficient temperature while in said zone to cause a rapid and efficient reaction between said material and said reagent; introducing a modifier into the turbulent flowing stream of said suspension whereby to obtain a uniformity of distribution of the modifier therein and subjecting the flowing stream of said suspension and the modifier to a cooling zone whereby to entrain the uniformly distributed modifier in the soap as it solidifies.

2. A process of producing a saponified product containing air bubbles directly from a saponifiable material by reaction with a saponifying reagent which comprises: passing a properly proportioned mixture of said saponifiable material and an aqueous solution of said saponifying reagent through a reaction zone in which the saponifying reagent reacts with the saponifiable material to produce a suspension containing a saponifying substance, said mixture being at a sufficiently high temperature while in said reaction zone to produce a rapid and efficient reaction between said material and said reagent, injecting compressed air into said suspension while in a state of turbulence whereby to secure an even distribution of the air therein and subjecting the suspension and the injected compressed air to a cooling zone whereby to entrain the air in the soap as it solidifies.

RALPH EVERETT BURNS.